(12) United States Patent
Park et al.

(10) Patent No.: US 8,552,583 B2
(45) Date of Patent: Oct. 8, 2013

(54) POWER SUPPLY SYSTEM AND METHOD INCLUDING POWER GENERATOR AND STORAGE DEVICE

(75) Inventors: Jung-Wook Park, Seoul (KR); Byung-Kwan Kang, Gyeonggi-do (KR); Hyun-Koo Lee, Seoul (KR); Seung-Tak Kim, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 148 days.

(21) Appl. No.: 13/232,360

(22) Filed: Sep. 14, 2011

(65) Prior Publication Data

US 2012/0069614 A1 Mar. 22, 2012

(30) Foreign Application Priority Data

Sep. 20, 2010 (KR) .................. 10-2010-0092683
Jun. 27, 2011 (KR) .................. 10-2011-0062318

(51) Int. Cl.
*B60L 1/00* (2006.01)
*H02M 5/42* (2006.01)

(52) U.S. Cl.
USPC ............................................ 307/10.1; 363/97

(58) Field of Classification Search
USPC .................................. 363/64–65, 67, 95, 97
See application file for complete search history.

(56) References Cited

U.S. PATENT DOCUMENTS

| | | | | |
|---|---|---|---|---|
| 5,563,479 A | * | 10/1996 | Suzuki | 318/139 |
| 5,926,004 A | * | 7/1999 | Henze | 320/109 |
| 7,279,855 B2 | * | 10/2007 | Tahara et al. | 318/46 |
| 2009/0001926 A1 | * | 1/2009 | Sato | 320/102 |
| 2011/0187184 A1 | * | 8/2011 | Ichikawa | 307/10.1 |
| 2011/0291479 A1 | | 12/2011 | Lee | |

FOREIGN PATENT DOCUMENTS

| | | |
|---|---|---|
| EP | 2400621 A2 | 12/2011 |
| KR | 1020110132122 A | 12/2011 |

OTHER PUBLICATIONS

Office Action issued on Jul. 13, 2012 in related Korean Application No. 10-2011-0062318 (5 pages).
English tranlsation of Abstract of KR1020110132122 (1 page).

* cited by examiner

*Primary Examiner* — Jue Zhang
*Assistant Examiner* — Henry Lee, III
(74) *Attorney, Agent, or Firm* — Brian J. Colandreo; Pamela K. Soggu; Holland & Knight LLP

(57) ABSTRACT

The present invention relates to a power supply system and method including a power generator and a storage device. Specifically, the power supply method using a power supply system which includes a power generator, a storage device, a unidirectional converter, and a bidirectional interleaved converter, and in which the other side of the unidirectional converter is connected to the other side of the bidirectional interleaved converter and power is output from the other side of the unidirectional converter, the power supply method comprises measuring one or more of an amount of power generation of the power generator and an amount of power storage of the storage device; forming a power transfer path by analyzing one or more of the amount of power generation and the amount of power storage; and controlling activation of devices on the formed power transfer path.

24 Claims, 9 Drawing Sheets

50

POWER SUPPLY SYSTEM AND METHOD INCLUDING POWER GENERATOR AND STORAGE DEVICE

CROSS-REFERENCE TO RELATED APPLICATIONS

This application is based on and claims priority from Korean Patent Application Nos. 10-2010-0092683, filed on Sep. 20, 2010, and 10-2011-0062318, filed on Jun. 27, 2011, in the Korean Intellectual Property Office, the disclosures of which are incorporated herein in their entirety by reference.

BACKGROUND OF THE INVENTION

1. Field of the Invention

The present invention relates to a power supply system and method including a power generator and a storage device, which can form a power transfer path for improving the power supply efficiency.

2. Description of the Prior Art

Among distributed power supplies, a power supply that generates DC power may perform photovoltaic power generation, fuel cell power generation, wind power generation, or the like, and an apparatus that performs reverse conversion of a received DC power into an AC power and supplies the AC power to a system is called a grid-interactive inverter.

That is, the grid-interactive inverter is a power conversion apparatus which converts a DC power supply that can be obtained from solar cells using sunlight that is a representative alternative energy source or fuel cells into an AC power supply using a semiconductor switch device, and supplies the AC-converted power to a predetermined power system.

The grid-interactive inverter has the features that the inverter is of a grid-interactive type, it is required that the DC input voltage has a very wide range, and the output power is always changed. That is, the grid-interactive inverter for the distributed power supply always has a different amount of output power, and it is required for the inverter to generate the power from "0" at a minimum to its own capacity.

Accordingly, the grid-interactive inverter has been developed as a power supply system that is configured to include a storage device which stores a surplus power when the amount of power generation is large and supplies the stored power when the amount of power generation is small.

FIG. 1 is a block diagram illustrating the configuration of a power supply system in the related art. Referring to FIG. 1, the power supply system in the related art includes a power generator 10, a boost converter 20, an inverter 30, a storage device 40, a DC-to-DC (DC/DC) converter 90, a path setting device 80, and a controller 70.

The power generator 10 is a device that generates electrical energy using kinetic energy, optical energy, and the like. Specifically, the power generator 10 is a device that converts energy in the form of kinetic energy, optical energy, or the like, into an electrical energy form.

The storage device 40 is a device that can store the electrical energy, and may be implemented using a battery or an element such as a super conductor.

The boost converter 20 is a device for converting a voltage of the electrical energy that is generated by the power generator into a voltage that is required in the inverter.

The inverter 30 has been described as above, and the detailed description thereof will be omitted.

The DC/DC converter 90 is a device that converts the boost-converted electrical energy so that the electrical energy has a voltage required in the storage device 40.

The path setting device 80 and the controller 70 transfer the boost-converted electrical energy to the inverter 30 when the system 60 requires the power and transfer the boost-converted electrical energy to the DC/DC converter 90 when the system 60 does not require the power. Further, the path setting device 80 and the controller 70 form a path for transferring the electrical energy stored in the storage device 40 to the inverter 30 when the amount of power generation performed by the power generator 10 is insufficient.

For this, the controller 70 receives situational information from the power generator 10, the storage device 40, and the system 60.

However, the power supply system in the related art has the problems that the power is consumed while the converter converts the voltage and the power quality is deteriorated during the power conversion.

SUMMARY OF THE INVENTION

Accordingly, the present invention has been made to solve the above-mentioned problems occurring in the prior art, and proposes a power supply system and method including a power generator and a storage device, which can improve the quality of the supplied power and heighten the power conversion efficiency.

Additional advantages, objects, and features of the invention will be set forth in part in the description which follows and in part will become apparent to those having ordinary skill in the art upon examination of the following or may be learned from practice of the invention.

According to an aspect of the present invention, a power supply system comprises a power generator generating electrical energy; a storage device storing the electrical energy; an inverter converting a DC power into an AC power and transferring the AC power to a system; a unidirectional converter connected to the inverter through the other side thereof to transfer power input through one side thereof to the other side thereof with its voltage changed; a bidirectional interleaved converter connected to the other side of the unidirectional converter through the other side thereof to transfer the power input through one side thereof to the other side thereof through an interleaving method with its voltage changed or to transfer the power input through the other side thereof to the one side thereof through the interleaving method with its voltage changed; and a path forming device forming a power transfer path between the power generator, the one side of the unidirectional converter, the one side of the bidirectional interleaved converter, and the storage device.

The path forming device forms a first path for connecting the power generator to the one side of the unidirectional converter and connecting the storage device to the one side of the bidirectional interleaved converter, or a second path for connecting the power generator to the one side of the bidirectional interleaved converter.

The power supply system further comprises one or more of a first sensor measuring an amount of power generation of the power generator; a second sensor measuring an amount of power storage of the storage device; and a third sensor measuring an amount of load of the system.

The path forming device receives one or more measured values of the amount of power generation, the amount of power storage, and the amount of load, and forms the first or second path.

The path forming device forms the first path if the amount of power storage is equal to or smaller than a minimum amount of power storage.

The path forming device forms the second path if the amount of power storage exceeds a sufficient amount of power storage.

The path forming device forms the second path if the amount of power generation exceeds the amount of load.

The path forming device forms the second path if the amount of power generation is equal to or larger than a predetermined value, and forms the first path if the amount of power generation is smaller than the predetermined value.

The path forming device comprises a first switch unit having a first terminal connected to the power generator and a second terminal connected to the unidirectional converter, and connecting the first terminal to one of the second terminal and a third terminal; and a second switch unit having a first terminal connected to the storage device, a second terminal connected to the bidirectional interleaved converter, and a third terminal connected to the third terminal of the first switch unit, and connecting the second terminal to one of the first terminal and the third terminal.

The path forming device connects the first terminal to the second terminal of the first switch unit and connects the first terminal to the second terminal of the second switch unit, or connects the first terminal to the third terminal of the first switch unit and connects the second terminal to the third terminal of the second switch unit.

According to another aspect of the present invention, a power supply system comprises a power generator generating electrical energy; a storage device storing the electrical energy; an inverter converting a DC power into an AC power and transferring the AC power to a system; a unidirectional converter connected to the inverter through the other side thereof to transfer power input through one side thereof to the other side thereof with its voltage changed; a bidirectional interleaved converter connected to the other side of the unidirectional converter through the other side thereof to transfer the power input through one side thereof to the other side thereof through an interleaving method with its voltage changed or to transfer the power input through the other side thereof to the one side thereof through the interleaving method with its voltage changed, and to change the number of current paths for power conversion according to a control signal; a path forming device forming a power transfer path between the power generator, the one side of the unidirectional converter, the one side of the bidirectional interleaved converter, and the storage device; and a controller controlling a power transfer direction of the bidirectional interleaved converter, the number of current paths for the power conversion, and forming of a path of the path forming device.

The path forming device forms a first path for connecting the power generator to the one side of the unidirectional converter and connecting the storage device to the one side of the bidirectional interleaved converter, or a second path for connecting the power generator to the one side of the bidirectional interleaved converter according to the control signal of the controller.

The controller adjusts the number of current paths for the power conversion of the bidirectional interleaved converter according to the amount of power generation of the power generator or the amount of power storage of the storage device.

The path forming device comprises a first switch unit having a first terminal connected to the power generator and a second terminal connected to the unidirectional converter, and connecting the first terminal to one of the second terminal and a third terminal; and a second switch unit having a first terminal connected to the storage device, a second terminal connected to the bidirectional interleaved converter, and a third terminal connected to the third terminal of the first switch unit, and connecting the second terminal to one of the first terminal and the third terminal.

According to an aspect of the present invention, a power supply method using a power supply system which includes a power generator, a storage device, a unidirectional converter, and a bidirectional interleaved converter, and in which the other side of the unidirectional converter is connected to the other side of the bidirectional interleaved converter and power is output from the other side of the unidirectional converter, the power supply method comprises measuring one or more of an amount of power generation of the power generator and an amount of power storage of the storage device; forming a power transfer path by analyzing one or more of the amount of power generation and the amount of power storage; and controlling activation of devices on the formed power transfer path.

The path forming step forms one path of a first path for connecting the power generator to the one side of the unidirectional converter to transfer the power; a second path for connecting the power generator to an input terminal of the unidirectional converter and connecting the one side of the bidirectional interleaved converter to the storage device to transfer the power; and a third path for connecting the power generator to the one side of the bidirectional interleaved converter to transfer the power.

The controlling step changes the number of current paths for the power conversion of the bidirectional interleaved converter according to the amount of power generation or the amount of power storage in the case where the bidirectional interleaved converter is provided on the formed power transfer path.

According to another aspect of the present invention, a power supply system comprises a power generator generating electrical energy; a storage device storing the electrical energy; an inverter converting a DC power into an AC power and transferring the AC power to a system; a first converter connected to the inverter to transfer input power to the inverter with its voltage changed; a second converter which is connected to the inverter, is arranged in parallel to the first converter, and transfers input power to the inverter with its voltage changed, or transfers power input through the inverter to the storage device with its voltage changed; a path forming device forming a power transfer path between the power generator, the first converter, the second converter, and the storage device; and a controller controlling a power transfer direction of the second converter, the number of current paths for power conversion, and formation of a path of the path forming device.

The first converter transfers power by using at least one of a unidirectional converter, a bidirectional converter, a unidirectional interleaved converter and a bidirectional interleaved converter.

The second converter transfers power in both directions by using at least one of a bidirectional converter and a bidirectional interleaved converter.

The power supply system further comprises at least one of a first sensor measuring an amount of power generation of the power generator; a second sensor measuring an amount of power storage of the storage device; and a third sensor measuring an amount of load of the system.

The path forming device connects the power generator with the first converter and connects the storage device with the second converter if the amount of power storage exceeds a predetermined minimum amount of power storage and is equal to or smaller than a predetermined maximum amount of power storage, and the amount of power generation exceeds the amount of load.

The path forming device connects the power generator with the first converter and connects the storage device with the second converter if the amount of power storage is equal to or larger than a predetermined minimum amount of power storage and is smaller than a predetermined maximum amount of power storage, and the amount of load exceeds the amount of power generation.

The path forming device connects the power generator with at least one of the first converter and the second converter if the amount of power storage is equal to or smaller than a predetermined minimum amount of power storage, and the amount of load exceeds the amount of power generation.

The path forming device connects the power generator with at least one of the first converter and the second converter if the amount of power storage is equal to or larger than a predetermined maximum amount of power storage, and the amount of power generation exceeds the amount of load.

The path forming device connects the power generator with the first converter and connects the storage device with the second converter if the amount of power storage is equal to or smaller than a predetermined minimum amount of power storage, and the amount of power generation exceeds the amount of load.

The path forming device connects the power generator with the first converter and connects the storage device with the second converter if the amount of power storage is equal to or larger than a predetermined maximum amount of power storage, and the amount of load exceeds the amount of power generation.

The path forming device connects the storage device with at least one of the first converter and the second converter if the amount of power generation is insufficient to supply power to the system.

The controller changes the number of the current paths based on the amount of power generation or the amount of power storage.

According to the power supply system and method including the power generator and the storage device according to the present invention, an optimum power transfer path is formed in consideration of the power generation amount, the power storage amount, and the load amount, and thus the power conversion efficiency and the power transfer efficiency can be improved.

According to the power supply system and method including the power generator and the storage device according to the present invention, the quality of the converted power can be improved and the whole cost including the system maintenance cost can be lowered through lengthening of the lifespan of the storage device.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art.

The same reference numbers indicate the same components throughout the specification. In the attached figures, the thickness of layers and regions is exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Prior to the description of the present invention, the influence that the power conversion efficiency and the power quality of a power supply system have from the viewpoint of development or marketability will be described.

In the general alternative energy field, it is very difficult to improve the power conversion efficiency of a power supply system by about 1%. Because of this, it becomes an important task in developing the power supply system to reduce the power that converters consume during power conversion.

Further, if the power quality of the power supply system is lowered, power supply ripple is increased. Such ripple may cause fatigue to be accumulated in a capacitor of a storage device to shorten the lifespan of the capacitor, or the storage device may be damaged by an abrupt excessive ripple. Further, since the price of the storage device is given great weight in the total manufacturing cost of the power supply system including the storage device, it is very important in the price competitiveness such as a maintenance cost to improve the quality of the supplied power of the power supply system together with the improvement of the use term of the power supply system.

Accordingly, the improvement of the power conversion efficiency and the improvement of the quality of the supplied power have a great effect on the improvement of the performance of the power supply system.

The power supply system and method according to the present invention adopts a bidirectional interleaved converter in order to overcome the deteriorations of the power conversion efficiency and the quality of the supplied power in the power supply system in the related art, and adaptively forms a power transfer path according to the operation situation.

Figure 1:
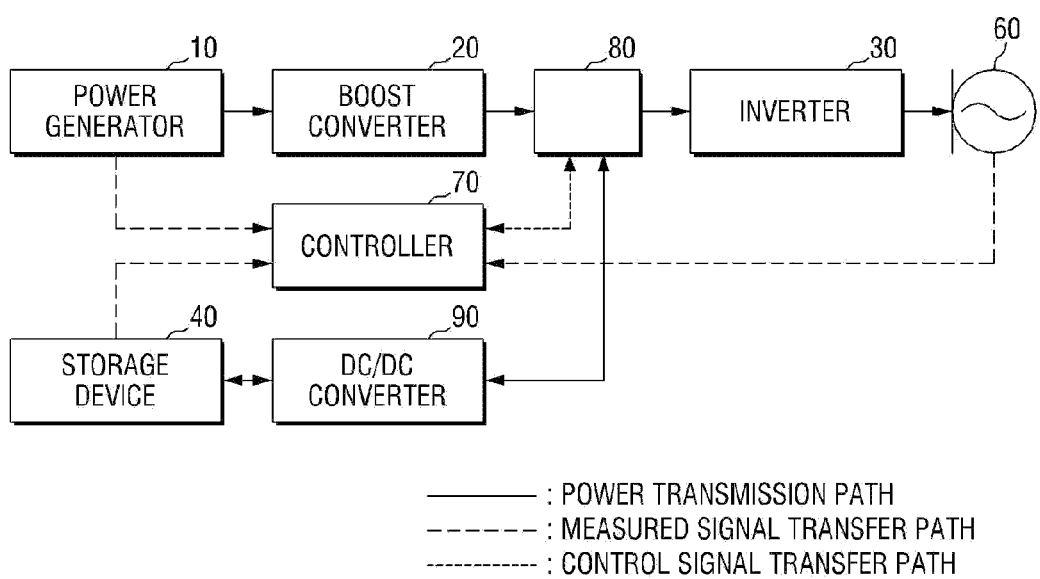
FIG. 1 is a block diagram illustrating the configuration of a power supply system in the related art.
Figure 2:
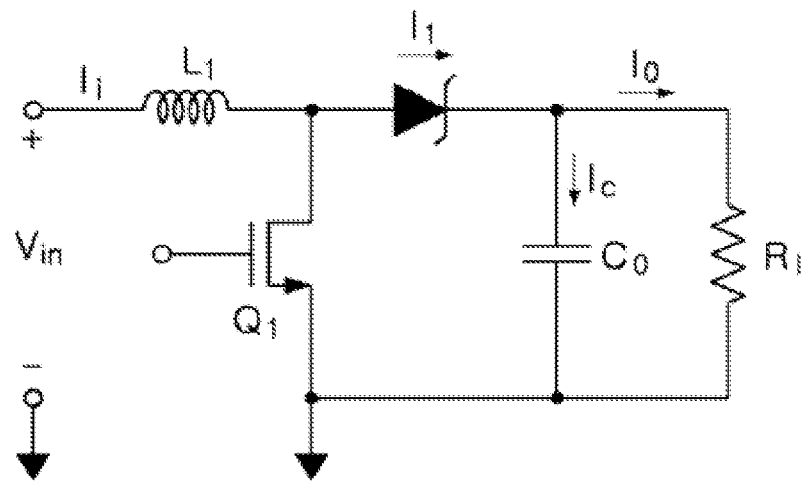
FIGS. 2A and 2B are diagrams illustrating a schematic circuit and the current amount at each node for explaining the operation of a boost converter.
Figure 2B:
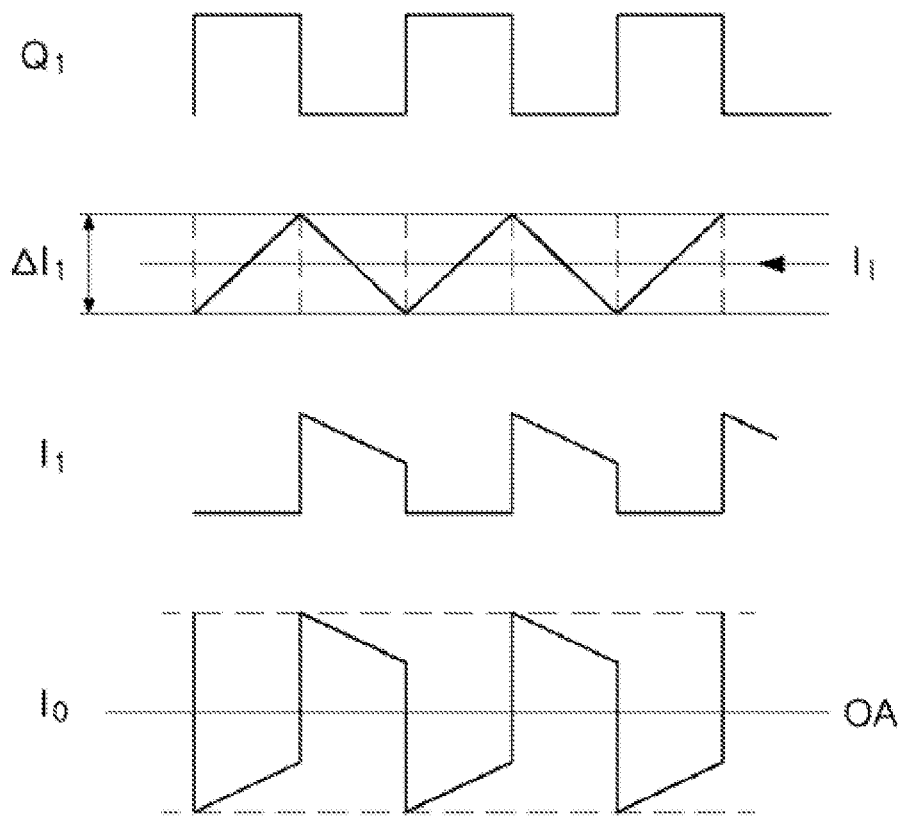

FIGS. 2A and 2B are diagrams illustrating a schematic circuit and the current amount at each node for explaining the operation of a boost converter.

Referring to FIG. 2A, a general boost converter may be configured to include an inductor L1, a diode, an output capacitor Co, and a switch gate Q1.

The inductor L1 serves to accumulate current energy, and the output capacitor Co serves to accumulate voltage energy. The switch gate Q1 serves to form a voltage that is higher than an input voltage Vin at both ends of the output capacitor Co by storing power in the inductor L1 through a periodic switching operation and transferring the stored power to the output capacitor Co.

Through FIG. 2B, the operation of the boost converter of FIG. 2A will be described.

If a high-level signal is applied to the gate of the switch gate Q1, current Iin that flows through the inductor L1 does not rise immediately, but rises with slew. While the current rises with slew, the inductor L1 can accumulate current energy.

If a low-level signal is applied to the switch gate Q1, the current that flows through the inductor L1 does not fall immediately, but falls with slew. At this time, the current energy stored in the inductor L1 is transferred to the output capacitor Co, and the voltage that forms at both ends of the output capacitor Co becomes a voltage that is higher than the input voltage Vin.

If the switch gate periodically repeats high-low levels, the current flowing through the inductor L1 has ripple around a constant average power Iin. Further, the output capacitor has a time in which the power is not transferred. Accordingly, the current (or power) that is supplied to not only the output capacitor Co but also a load end has the ripple.

In the power supply or power conversion apparatus, the quality of the output power is determined based on the constancy of the output power and the ripple of the output power. Accordingly, if the output power has a big ripple, it may be considered that the power quality is deteriorated.

This is because an electrical shock is applied to load components, such as the capacitor, the inductor, the resistor, and the like, which constitute load equipment that is connected to the rear end of the power supply or power conversion apparatus, to cause fatigue to be accumulated when a signal having the ripple is supplied to the load equipment.

Figure 3A:
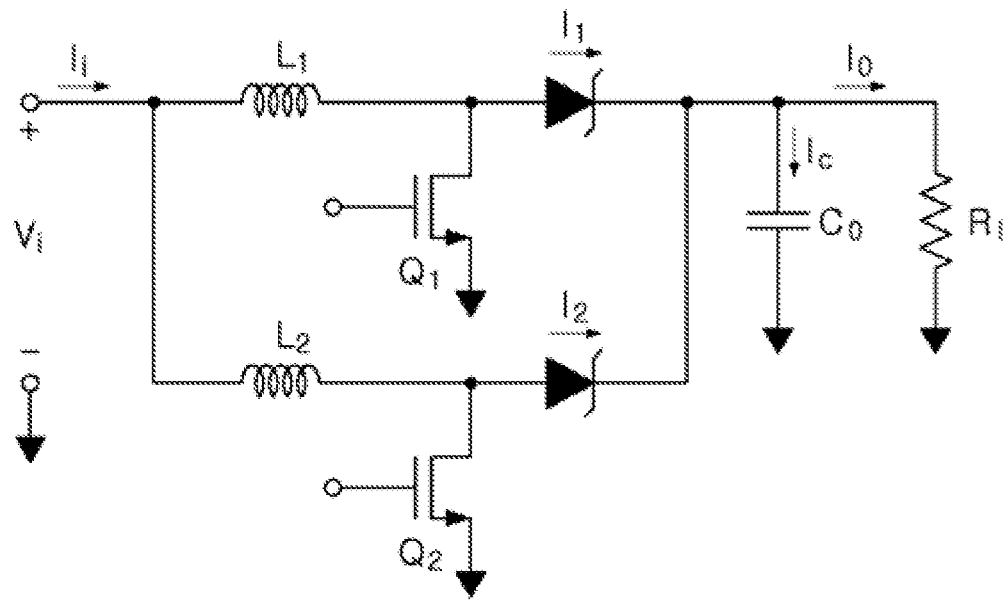
FIGS. 3A and 3B are diagrams illustrating a schematic circuit and the current amount at each node for explaining the operation of an interleaved converter.
Figure 3B:
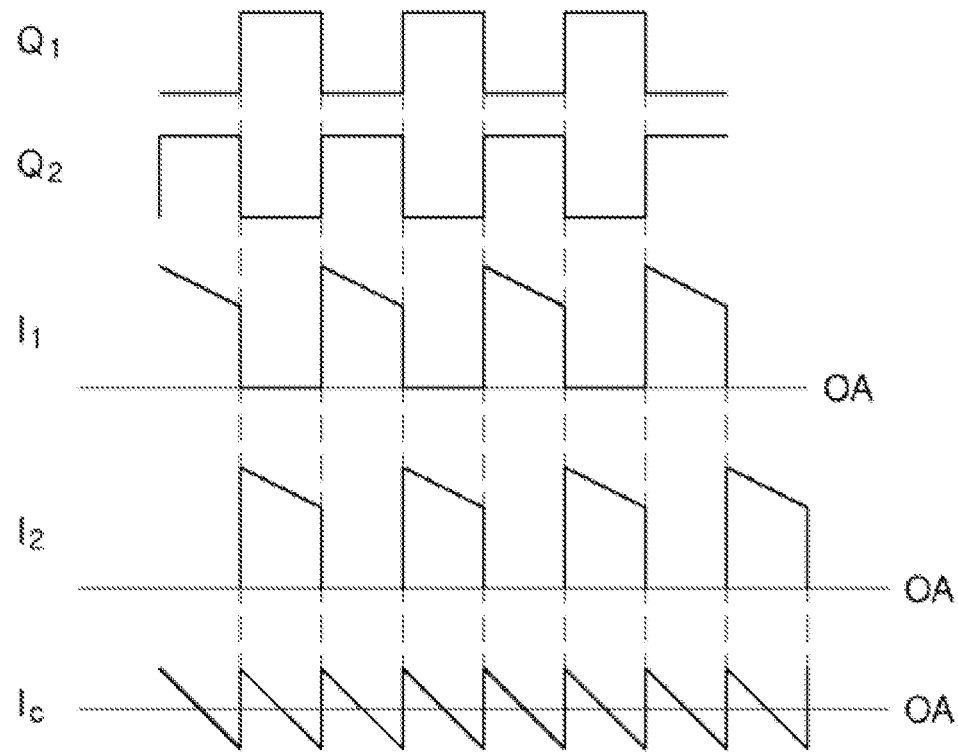

FIGS. 3A and 3B are diagrams illustrating a schematic circuit and the current amount at each node for explaining the operation of an interleaved converter.

Referring to FIG. 3A, in the interleaved converter, unlike the boost converter, circuits are arranged in parallel between the input terminal and the output capacitor Co. That is, paths, which are composed of inverters L1 and L2, switching gates Q1 and Q2, and diodes, respectively, are arranged in parallel.

Halves of current flow through the paths arranged in parallel, respectively, and by adjusting the high-level timing of the signals applied to the gates of the switch gates Q1 and Q2, the current can alternately flow through the paths.

Referring to FIG. 3B, it can be confirmed that the interleaved converter has current waveforms of which the size is ½ of the size of the current waveform of the boost converter as illustrated in FIG. 3A and which are formed to overlap each other.

Specifically, by alternately applying a high-level signal to the gates of the switch gates Q1 and Q2, the current flowing through L1 and the current flowing through L2 have a phase difference of 180 degrees. Accordingly, the current flowing through the output capacitor Co appears as the sum of the respective currents, and unlike that as illustrated in FIG. 2B, the output capacitor does not have the time in which the power is not transferred. Further, I1 and I2 overlap each other, and it can be confirmed that the frequency of the ripple of Ic becomes twice and swing of the ripple is reduced. If the period of the ripple is increased and the width of swing is reduced, the waveform becomes more similar to a DC component, and thus the power quality of the converter may be improved.

Further, the interleaved converter has a reduced size of an iron core of the inductor in comparison to a general boost converter, and it is possible to design the converter even with small-sized inductors. Accordingly, since the physical size of the converter is reduced, the integration of the converter onto the circuit is facilitated and the manufacturing cost is reduced.

Figure 4:
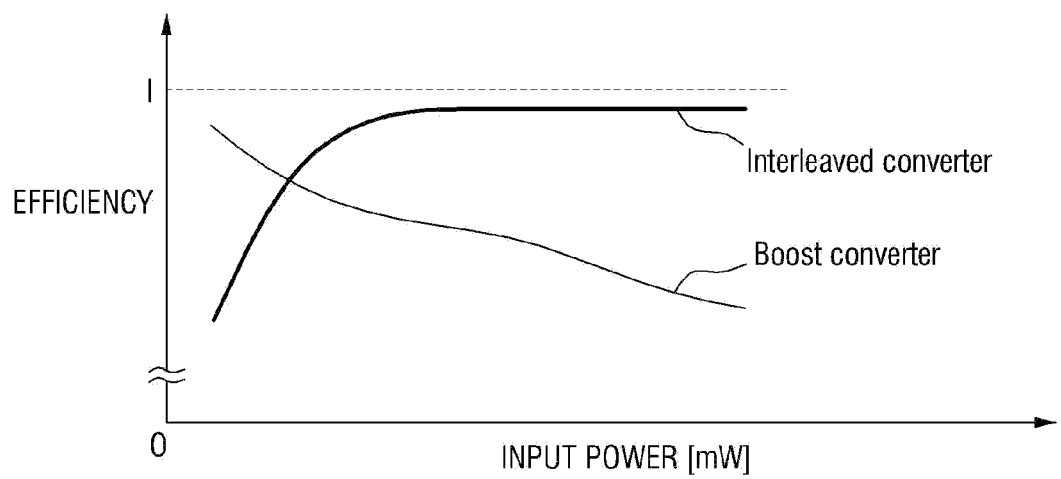
FIG. 4 is a graph illustrating input power versus conversion efficiency of a boost converter and an interleaved converter.

FIG. 4 is a graph illustrating input power versus conversion efficiency of a boost converter and an interleaved converter.

Referring to FIG. 4, it can be seen that the power conversion efficiencies of the boost converter and the interleaved converter show different aspects according to the input powers. The boost converter has high conversion efficiency if the input power is low and has low power conversion efficiency if the input power is high. By contrast, the interleaved converter has low conversion efficiency if the input power is low, but has high conversion efficiency if the input power is heightened.

Since the interleaved converter periodically switches the operation path, a power loss according to the switching occurs, and thus the power conversion efficiency is lowered in a low-power situation.

However, in the case of alternative energy such as photovoltaic power generation, the variation width of the power generation amount becomes large according to the surrounding environmental situation, and thus the variation width of the input power becomes very large. Accordingly, the entire power conversion efficiency may be lowered by using the interleaved converter. Accordingly, it is required to propose a power supply system that can adaptively use a converter according to the input power such as the amount of power generation or the like.

Figure 5:
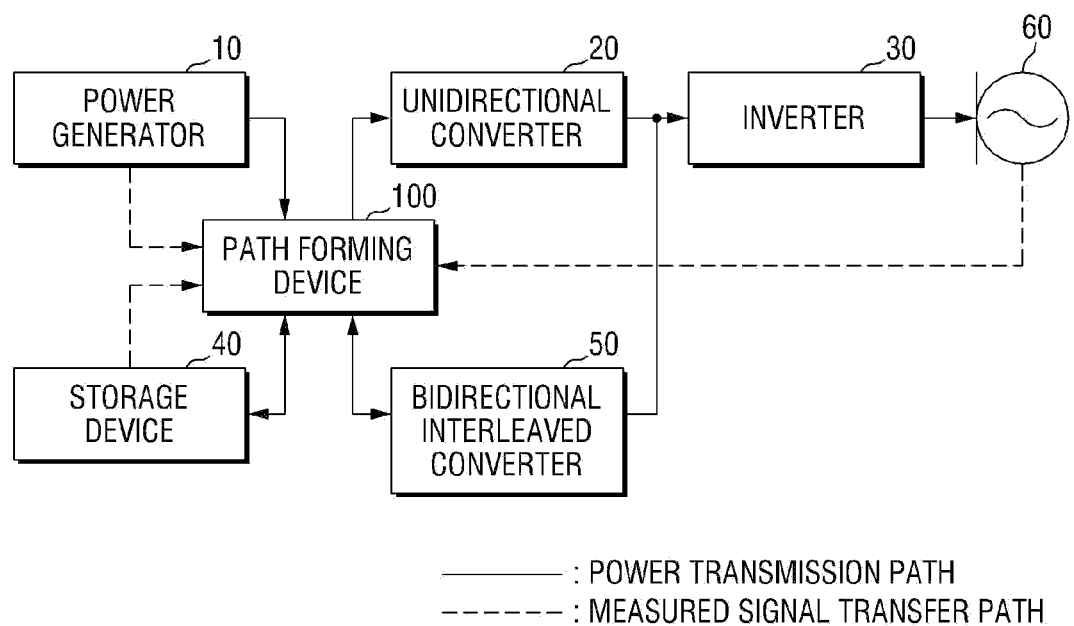
FIG. 5 is a block diagram illustrating the configuration of a power supply system according to an embodiment of the present invention.

FIG. 5 is a block diagram illustrating the configuration of a power supply system according to an embodiment of the present invention.

Referring to FIG. 5, the power supply system according to an embodiment of the present invention includes a power generator 10, a unidirectional converter 20, an inverter 30, a storage device 40, a bidirectional interleaved converter 50, and a path forming device 100.

The power generator 10, the inverter 30, and the storage device 40 have been described as above, and the detailed description thereof will be omitted.

The unidirectional converter 20 is connected to the inverter through the other side thereof, and can transfer the power input through one side thereof to the other side with its voltage changed. It is preferable that the voltage transferred to the other size thereof is set to a required voltage of the inverter 30. If needed, the unidirectional converter 20 may be implemented by a boost converter.

The bidirectional interleaved converter 50 may transfer the power input through one side thereof to the other side thereof through an interleaved method with its voltage changed, or transfer the power input through the other side thereof to the one side thereof through an interleaved method with its voltage changed. Further, the other side of the unidirectional converter 20 and the other side of the bidirectional interleaved converter 50 may be connected to each other.

The bidirectional interleaved converter 50 is a converter which converts the voltage in the interleaved method, that is, which converts and transfers the power from the one side thereof to the other side thereof, or converts and transfers the power from the other side thereof to the one side thereof.

The path forming device 100 may connect the power generator to one side of the unidirectional converter or one side of the bidirectional interleaved converter, and connect the storage device to one side of the unidirectional converter or one side of the bidirectional interleaved converter. Using the path forming device 100, the power generated by the power generator 10 is transferred to the inverter 30 and the system 60, or is stored in the storage device 40. Further, the power stored in the storage device 40 is transferred to the inverter 30 and the system 60.

A path through which the power generated by the power generator 10 is transferred to the inverter 30 and the system 60 may be divided into a path for passing through the unidirectional converter 20 and a path for passing through the bidirectional interleaved converter 50. The path forming device 100 may select the power transfer path having higher power transfer efficiency of the two paths in consideration of the amount of power generation or the like.

Further, the path forming device 100 may form a path so that the power generated by the power generator 10 can be supplied to the storage device.

As an example of forming a path, the path forming device 100 may form a path by selecting one of a first path for connecting the power generator 10 only to one side of the unidirectional converter 20, a second path for further connecting the storage device 40 to one side of the bidirectional interleaved converter 50 in the first path, and a third path for connecting the power generator 10 to one side of the bidirectional interleaved converter 50.

The first path is a power transfer path for transferring only the power generated by the power generator 10 to the system 60. If sufficient power is not stored in the storage device 40, the path forming device 100 may transfer only the power generated by the power generator 10 through the first path.

The second path is a power transfer path for transferring the power generated by the power generator 10 and the power stored in the storage device 40, or transferring the power generated by the power generator to the system 60 and the storage device 40. If the power stored in the storage device 40 is sufficient, the power stored in the storage device 40 may be supplied to the system 60 together with the power generated by the power generator 10. Further, in the case where the power generated by the power generator 10 is sufficient, the power is transferred to the system 60 and the storage device 40 to be stored, and thus an effective use of the generated power can be sought.

The third path can transfer the power through the bidirectional interleaved converter 50 in order to transfer the power generated by the power generator 10 to the system with higher efficiency. Referring to FIG. 4, for superior power conversion efficiency in comparison to the unidirectional converter, the path forming device 100 transfers the generated power by forming the third path when the generated power is equal to or larger than the predetermined value, and transfers the generated power through the first path when the generated power is smaller than the predetermined value.

Referring to FIG. 5, the power supply system according to an embodiment of the present invention may further include a first sensor measuring the amount of power generation of the power generator, a second sensor measuring the amount of power storage of the storage device, and a third sensor measuring the amount of load of the system. In order to optimize the power transfer efficiency of the power supply system, the path forming device 100 may form the path by receiving and analyzing one or more values of the amount of power generation, the amount of power storage, and the amount of load.

The path forming device 100 forms the first path or the third path if the amount of power storage is equal to or smaller than the minimum amount of power storage, and forms the second path if the amount of power storage exceeds the sufficient amount of power storage. Further, if the amount of load exceeds the amount of power generation, the path forming device 100 forms the second path, while if the amount of power generation exceeds the amount of load, the path forming device 100 forms the first path or the third path.

If the amount of power generation is equal to or larger than the predetermined value, the path forming device 100 forms the third path, while if the amount of power generation is smaller than the predetermined value, the path forming device 100 forms the first path or the second path.

Figure 6:
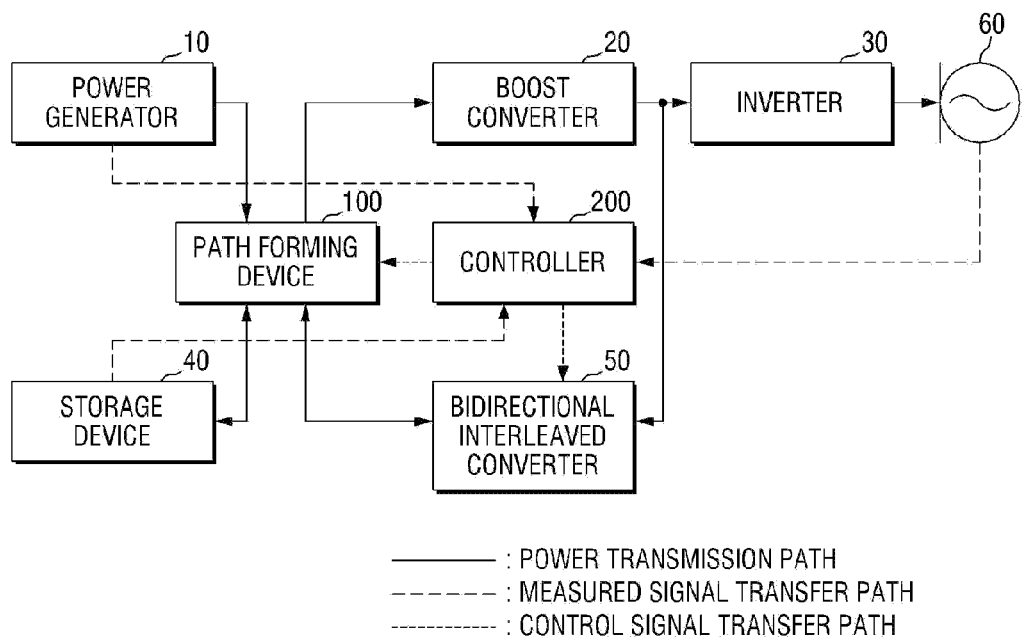
FIG. 6 is a block diagram illustrating the configuration of a power supply system according to another embodiment of the present invention.

FIG. 6 is a block diagram illustrating the configuration of a power supply system according to another embodiment of the present invention.

Referring to FIG. 6, the power supply system according to this embodiment of the present invention includes a power generator 10, a unidirectional converter 20, an inverter 30, a storage device 40, a bidirectional interleaved converter 50, a path forming device 100, and a controller 200.

The power generator 10, the unidirectional converter 20, the inverter 30, the storage device 40, the bidirectional interleaved converter 50, and the path forming device 100 have been described as above, and the detailed description thereof will be omitted.

The bidirectional interleaved converter 50 converts the voltage and transfers the power through an interleaving method in which a plurality of current paths successively operate with phase differences. If the number of current paths is increased, the number of current paths for the power conversion is increased. Accordingly, the power efficiency is heightened and the power quality is heightened. However, if the number of current paths is increased, the power loss according to the switching is also increased, and thus the input power for providing the optimum conversion efficiency is heightened.

As a method for solving this problem, the controller of the power supply system according to this embodiment of the present invention controls the number of current paths for the power conversion of the bidirectional interleaved converter 50. If the input power is low, the controller 200 performs interleaving by using only two current paths, while if the input power becomes high, the controller 200 controls to heighten the power conversion efficiency by increasing the number of current paths for the power conversion.

Further, the controller may optimize the power transfer efficiency of the whole power supply system by controlling the path forming operation of the path forming device 100.

For this, the controller 200 receives one measured value of the amount of power generation, the amount of power storage, and the amount of load, selects a power transfer path, and determines the number of current paths for the power conversion of the bidirectional interleaved converter 50.

The power supply system illustrated in FIG. 5 or 6 sets the power transfer path in consideration of the amount of power generation, the amount of power storage, and the amount of load, and through this, has more superior power transfer efficiency that that of the power supply system in the related art. Further, the power supply system improves the quality of the entire supplied power, maintains the quality of power supplied to the storage device 40 at a superior level, and lengthens the lifespan of the storage device 40.

Figure 7:
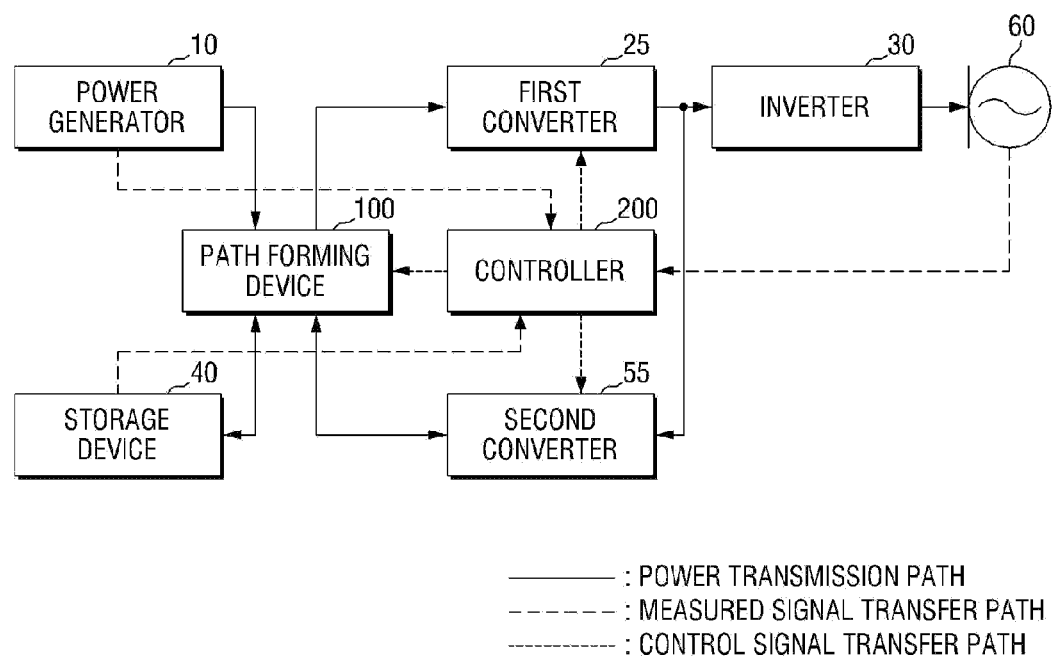
FIG. 7 is a block diagram illustrating the configuration of a power supply system according to still another embodiment of the present invention

FIG. 7 is a block diagram illustrating the configuration of a power supply system according to still another embodiment of the present invention.

Referring to FIG. 7, the power supply system according to this embodiment of the present invention may include a power generator 10, a first converter 25, an inverter 30, a storage device 40, a second converter 55, a path forming device 100, and a controller 200.

The power generator 10, the inverter 30, the storage device 40, the path forming device 100 and the controller 200 have been described above, and the detailed description thereof will be omitted.

The first converter 25 is connected to the inverter 30 to transfer input power to the inverter 30 with its voltage changed. At least one of a unidirectional converter, a bidirectional converter, a unidirectional interleaved converter and a bidirectional interleaved converter may be used as the first converter 25 to transfer the power in one direction and/or both directions. That is, the unidirectional converter and the unidirectional interleaved converter may transfer the power in one direction, and the bidirectional converter and the bidirectional interleaved converter may transfer the power in both directions.

The second converter 55 is connected to the inverter 30 and arranged in parallel to the first converter 25. The second converter 55 transfers input power to the inverter 30 with its voltage changed, or transfers the power input through the inverter 30 to the storage device 40 with its voltage changed. At least one of the bidirectional converter and the bidirectional interleaved converter may be used as the second converter 55 to transfer the power in both directions.

As examples of forming a path, the path forming device 100 may form a first path for connecting the power generator 10 only to one side of the first converter 25, and a second path for further connecting the storage device 40 to one side of the second converter 55 in the first path. Further, the path forming device 100 may form a third path for connecting the power generator 10 to one side of the second converter 55, and a fourth path for further connecting the storage device 40 to one side of the first converter 25 in the third path. Furthermore, the path forming device 100 may form a fifth path for connecting the storage device 40 only to one side of the first converter 25, and a sixth path for connecting the storage device 40 to one side of the second converter 55.

The first path is a power transfer path for transferring only the power generated by the power generator 10 to the system 60. If sufficient power is not stored in the storage device 40, the path forming device 100 may transfer only the power generated by the power generator 10 to the system 60 through the first path.

The second path is a power transfer path for transferring both the power generated by the power generator 10 and the power stored in the storage device 40 to the system 60, or transferring the power generated by the power generator to the system 60 and the storage device 40. If the power stored in the storage device 40 is sufficient, the power stored in the storage device 40 may be supplied to the system 60 together with the power generated by the power generator 10. Further, in a case where the power generated by the power generator 10 is sufficient, the power is transferred to not only the system 60 but also the storage device 40 to be stored, and thus an effective use of the generated power can be promoted.

The third path can transfer the power through the second converter 55 in order to transfer the power generated by the power generator 10 to the system with higher efficiency. In particular, in a case where the second converter 55 is the bidirectional interleaved converter, the power is transferred with higher efficiency.

The fourth path is, similarly to the second path, a power transfer path for transferring both the generated power and the stored power to the system 60, or transferring the generated power to the system 60 and the storage device 40. In this case, the number of paths of the first converter 25 and the second converter 55 is adjusted according to the output amount of the power generator 10 and the storage device 40. For example, when the power generator 10 transfers the power to the system 60 through the first converter 25, the power may be transferred to the system 60 by using some of current paths of the second converter 55 in addition to the first converter 25. That is, the power generator 10 uses some of current paths of the second converter 55, and the storage device 40 uses the remaining current paths of the second converter 55. In a case where the current paths passing through the second converter 55 are divided and used by the power generator 10 and the storage device 40, the path forming device 100 is additionally connected in parallel. Accordingly, in a case of FIG. 8, the path forming device 100 includes a pair of units connected in parallel.

The fifth path is a power transfer path for transferring the power stored in the storage device 40 to the system 60 if the generated power is insufficient, for example, if the operation of the power generator 10 is impossible due to insufficiency of sunlight.

The sixth path is a power transfer path for transferring the stored power to the system 60 if the generated power is insufficient, or transferring the remaining power after being consumed in the system 60 to the storage device 40.

As described above, the power supply system according to the embodiment of the present invention may further include one or more of a first sensor measuring the amount of power generation of the power generator 10, a second sensor measuring the amount of power storage of the storage device 40, and a third sensor measuring the amount of load of the system 60. In order to optimize the power transfer efficiency of the power supply system, the path forming device 100 may form the path by receiving and analyzing one or more values of the amount of power generation, the amount of power storage, and the amount of load. Hereinafter, a path forming operation according to the amount of power generation, the amount of power storage, and the amount of load will be described in detail.

If the amount of power storage exceeds a predetermined minimum amount of power storage and is equal to or smaller than a predetermined maximum amount of power storage, and the amount of power generation exceeds the amount of load, since a difference between the amount of power generation and the amount of load can be stored in the storage device 40, the path forming device 100 forms the second path by connecting the power generator 10 with the first converter 25 and connecting the storage device 40 with the second converter 55. Alternatively, the first converter 25 may be configured as a bidirectional converter or a bidirectional interleaved converter, and the path forming device 100 may form the fourth path by connecting the power generator 10 with the second converter 55 and connecting the storage device 40 with the first converter 25.

Further, if the amount of power storage is equal to or larger than a predetermined minimum amount of power storage and is smaller than a predetermined maximum amount of power storage, and the amount of load exceeds the amount of power generation, since it is necessary to supply the power stored in the storage device 40 to the system 60, the path forming device 100 forms the second path by connecting the power generator 10 with the first converter 25 and connecting the storage device 40 with the second converter 55. Alternatively, the first converter 25 may be configured as a bidirectional converter or a bidirectional interleaved converter, and the path forming device 100 may form the fourth path by connecting the power generator 10 with the second converter 55 and connecting the storage device 40 with the first converter 25.

Further, if the amount of power storage is equal to or smaller than a predetermined minimum amount of power storage, and the amount of load exceeds the amount of power generation, since the storage device 40 cannot supply the power and it is necessary to increase the power transfer efficiency of the power supplied from the power generator 10, the path forming device 100 forms the first path or the third path by connecting the power generator 10 with at least one of the first converter 25 and the second converter 55. Alternatively, the path forming device 100 may form the first path and the third path at the same time such that the power is supplied to the system 60 from the power generator 10 by using the first converter 25 and the second converter 55 at the same time.

Further, if the amount of power storage is equal to or larger than a predetermined maximum amount of power storage, and the amount of power generation exceeds the amount of load, since the storage device 40 cannot store the power anymore and it is necessary to increase the power transfer efficiency of the power supplied from the power generator 10, the path forming device 100 forms the first path or the third path by connecting the power generator 10 with at least one of the first converter 25 and the second converter 55. Alternatively, the path forming device 100 may form the first path and the third path at the same time such that the power is supplied to the system 60 from the power generator 10 by using the first converter 25 and the second converter 55 at the same time.

Further, if the amount of power storage is equal to or smaller than a predetermined minimum amount of power storage, and the amount of power generation exceeds the amount of load, the path forming device 100 forms the second path by connecting the power generator 10 with the first converter 25 and connecting the storage device 40 with the second converter 55, thereby storing a difference between the amount of power generation and the amount of load in the storage device 40. Alternatively, in order to store the power in the storage device 40, the path forming device 100 may form the fourth path by connecting the power generator 10 with one side of the second converter 55 and connecting the storage device 40 with one side of the first converter 25.

Further, if the amount of power storage is equal to or larger than a predetermined maximum amount of power storage, and the amount of load exceeds the amount of power generation, since it is necessary to supply the power from the storage device 40 to the system 60, the path forming device 100 forms the second path by connecting the power generator 10 with the first converter 25 and connecting the storage device 40 with the second converter 55, thereby supplying the power from the storage device 40 to the system 60. Alternatively, in order to supply the power to the system 60, the path forming device 100 may form the fourth path by connecting the power generator 10 with one side of the second converter 55 and connecting the storage device 40 with one side of the first converter 25.

Further, if the amount of power generation is insufficient to supply the power to the system, the path forming device 100 connects the storage device 40 with at least one of the first converter 25 and the second converter 55. In other words, if the power generator 10 cannot supply the power to the system 60, the fifth path or the sixth path is used in order to efficiently supply the power from the storage device 40 to the system 60. Alternatively, the path forming device 100 forms the fifth path and the sixth path at the same time, thereby transferring the power to the system 60 from the storage device 40 with higher power transfer efficiency. Further, in a case the power of the system 60 remains even if the power generator 10 cannot supply the power to the system 60, in order to store the remaining power in the storage device 40, the path forming device 100 may form the fifth path or the sixth path, or may form the fifth path and the sixth path at the same time.

Figure 8:
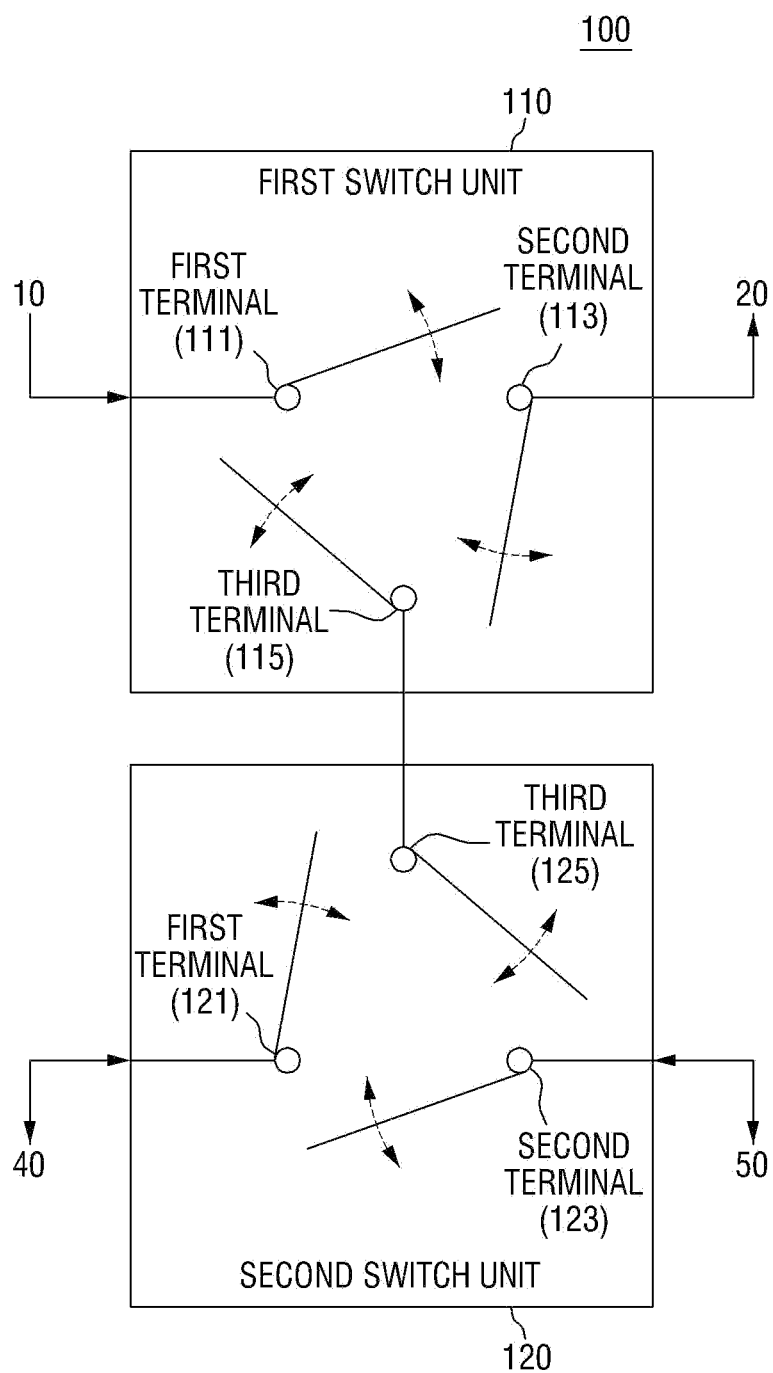
FIG. 8 is a diagram illustrating the configuration of a path setting device of a power supply system according to an embodiment of the present invention.

As described above, the controller 200 controls the path forming operation of the path forming device 100 to optimize the power transfer efficiency of the whole power supply system. In particular, since the interleaved converter can be used as the first converter 25 and the second converter 55, the controller 200 can adjust the number of current paths based on the amount of power generation or the amount of power storage. Further, since the second converter 55 is a bidirectional converter, the controller 200 can control the power transfer direction of the second converter 55. FIG. 8 is a diagram illustrating the configuration of a path setting device of a power supply system according to an embodiment of the present invention.

Referring to FIG. 8, the path forming device 100 according to this embodiment of the present invention may be configured to include a first switch unit 110 and a second switch unit 120. The first switch unit 110 has a first terminal 111 connected to the power generator 10 and a second terminal 113 connected to the unidirectional converter 20, and connects the first terminal 111 to one of the second terminal 113 and a third terminal 115. In this case, the unidirectional converter 20 may be replaced with the first converter 25. At least one of a bidirectional converter, a unidirectional interleaved converter and a bidirectional interleaved converter in addition to the unidirectional converter 20 may be used as the first converter 25.

The second switch unit 120 has a first terminal 121 connected to the storage device 40, a second terminal 123 connected to the bidirectional interleaved converter 50, and a third terminal 125 connected to the third terminal 115 of the first switch unit 110, and connects the second terminal 123 to one of the first terminal 121 and the third terminal 125. In this case, the bidirectional interleaved converter 50 may be replaced with the second converter 55. A bidirectional converter in addition to the bidirectional interleaved converter 50 may be used as the second converter 55.

The first switch unit 110 allows connection among the first terminal 111, the second terminal 113 and the third terminal 115, thereby forming the first to sixth paths as described above.

In the same way as the first switch unit 110, the second switch unit 120 allows connection among the first terminal 111, the second terminal 113 and the third terminal 115, thereby forming the first to sixth paths as described above.

Figure 9:
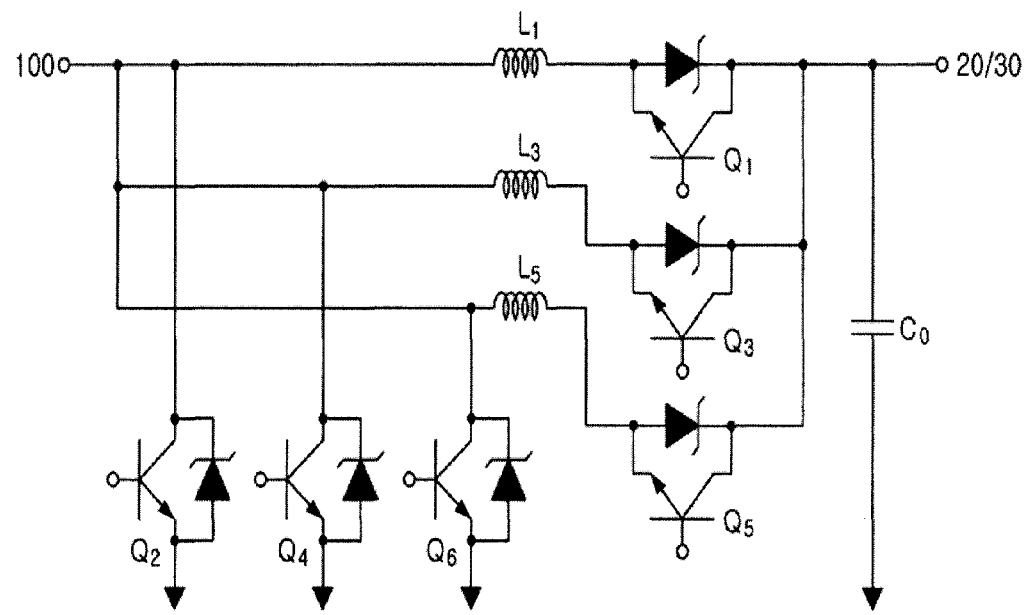
FIG. 9 is a circuit diagram illustrating a bidirectional interleaved converter circuit of a power supply system according to an embodiment of the present invention.

That is, the path forming device 100 forms various paths according to the connection relation among the terminals 111, 113, 115, 121, 123 and 125 of the first switch unit 110 and the second switch unit 120. FIG. 9 is a circuit diagram illustrating a bidirectional interleaved converter circuit of a power supply system according to an embodiment of the present invention.

Referring to FIG. 9, the bidirectional interleaved converter 50 according to this embodiment of the present invention determines the power transfer direction and performs voltage conversion in the interleaving method by applying a control signal to the gates of the switch gates Q1 to Q6.

When the path setting device 100 transfers the power in the direction of the inverter 30, a low-level signal is constantly applied to the base terminals of the first, third, and fifth switch gates Q1, Q3, and Q5 of the bidirectional interleaved converter 50, and a high-level signal having a phase difference of ⅓ period is applied to the base terminals of the second, fourth, and sixth switch gates Q2, Q4, and Q6, so that the voltage is converted in the interleaving method and the power is transferred.

When the unidirectional converter 20 transfers the power in the direction of the path setting device 100, a low-level signal is constantly applied to the base terminals of the second, fourth, and sixth switch gates Q2, Q4, and Q6 of the bidirectional interleaved converter 50, and a high-level signal having a phase difference of ⅓ period is applied to the base terminals of the first, third, and fifth switch gates Q1, Q3, and Q5, so that the voltage is converted in the interleaving method and the power is transferred.

Figure 10:
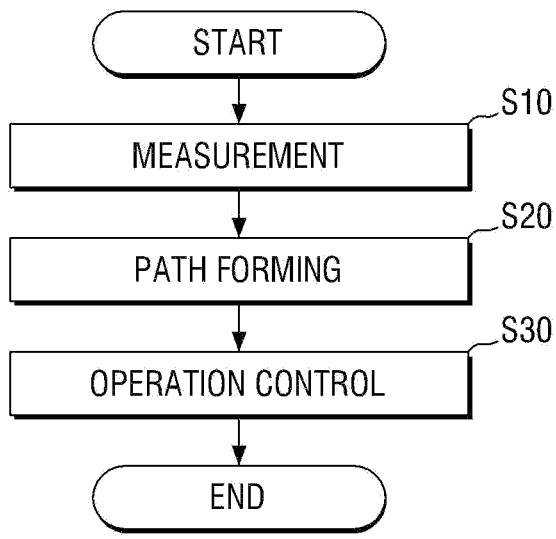
FIG. 10 is a flowchart illustrating the flow of a power supply method according to an embodiment of the present invention.

FIG. 10 is a flowchart illustrating the flow of a power supply method according to an embodiment of the present invention.

Referring to FIG. 10, the power supply method according to an embodiment of the present invention includes a measurement step (S10), a path forming step (S20), and an operation control step (S30).

The power supply method according to an embodiment of the present invention may be performed using a power supply system which includes a power generator 10, a storage device 40, a unidirectional converter 20, and a bidirectional interleaved converter 50, and in which the other side of the unidirectional converter 20 is connected to the other side of the bidirectional interleaved converter 50 and power is output from the other side of the unidirectional converter 20.

In the measuring step (S10), one or more of the amount of power generation of the power generator 10 and the amount of power storage of the power storage device 40 may be measured, and as needed, the amount of load of the system 60 may be further measured. The measured values are analyzed and used as data for setting a power transfer path of the power supply system.

In the path forming step (S20), a power transfer path may be formed by analyzing one or more of the amount of power generation and the amount of power storage, and the path may be formed by further analyzing the amount of load. Particularly, in the path forming step (S20), by analyzing the amount of power generation, the amount of power storage, and the amount of load, one path of a first path for connecting the power generator to the one side of the unidirectional converter to transfer the power, a second path for connecting the power generator to an input terminal of the unidirectional converter and connecting the one side of the bidirectional interleaved converter to the storage device to transfer the power, and a third path for connecting the power generator to the one side of the bidirectional interleaved converter to transfer the power may be formed.

That is, in the path forming step (S20), a path in which the power supply system has the best power transfer efficiency is formed by analyzing the amount of power generation, the amount of power storage, and the amount of load.

In the operation control step (S30), the number of current paths for the power conversion of the bidirectional interleaved converter may be changed according to the amount of power generation or the amount of power storage in the case where the bidirectional interleaved converter is provided on the power transfer path.

Further, as needed, in the path forming step (S20), one of the second path and the third path is formed, and in the operation control step (S30), the operation of the bidirectional interleaved converter is stopped to transfer the power in the same manner as in the first path.

Figure 11:
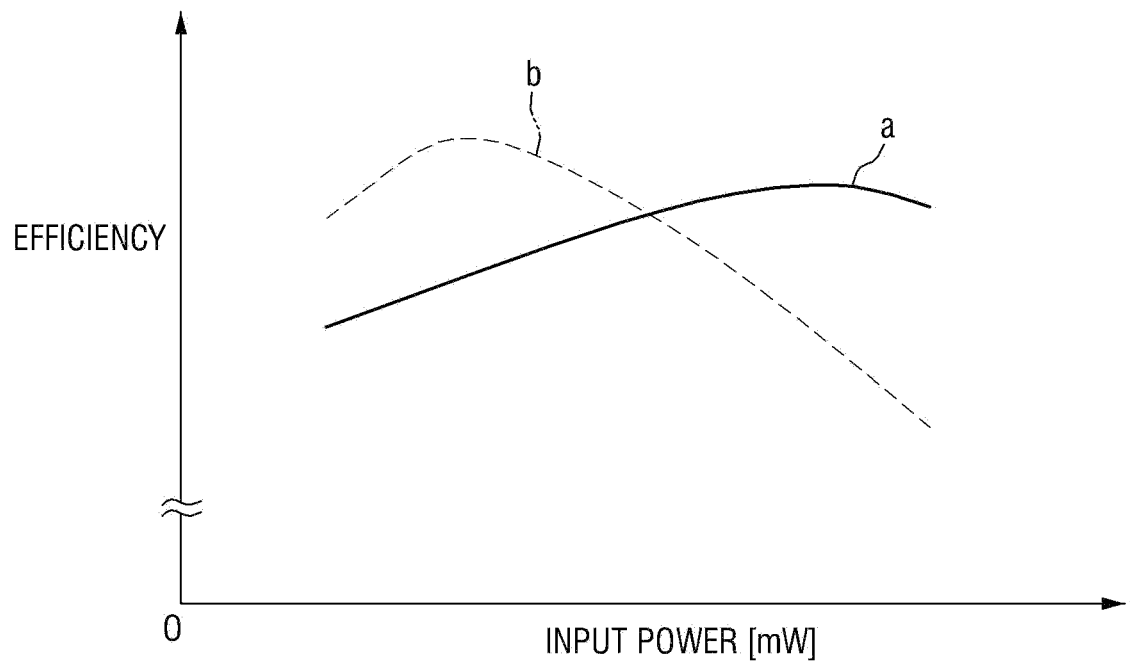
FIG. 11 is a graph illustrating the power transfer efficiency according to a power supply system and method according to an embodiment of the present invention.

FIG. 11 is a graph illustrating the power transfer efficiency according to a power supply system and method according to an embodiment of the present invention.

Referring to FIG. 11, it can be seen that the efficiency increases as the input power increases when interleaving is performed (a), but the efficiency increases and rapidly decreases as the input power increases when interleaving is not performed (b). Therefore, according to the power supply system and method according to the embodiments of the present invention, the power transfer efficiency is heightened using a path through the boost converter or the first converter in the case where the input power is low, and the power transfer efficiency is maintained at high level using the bidirectional interleaved converter or the second converter in a high-power situation.

Further, referring to FIG. 11, in comparison to the case (b) where the power transfer path is controlled using only the path forming device according to the present invention, it can be confirmed that the power transfer efficiency is further heightened in the case (a) where even the number of current paths for the power conversion of the bidirectional interleaved converter is controlled.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A power supply system comprising:
   a power generator configured to generate electrical energy;
   a storage device configured to store the electrical energy;
   an inverter configured to convert a DC power into an AC power and transferring the AC power to a system;
   a unidirectional converter configured to transfer power input through one side of the unidirectional converter to the other side of the unidirectional converter with its voltage changed, the unidirectional converter being connected to the inverter through the other side of the unidirectional converter;
   a bidirectional interleaved converter configured to transfer the power input through one side of the bidirectional interleaved converter to the other side of the bidirectional interleaved converter through an interleaving method with its voltage changed or to transfer the power input through the other side of the bidirectional interleaved converter to the one side of the bidirectional interleaved converter through the interleaving method with its voltage changed, the bidirectional interleaved converter being connected to the other side of the unidirectional converter through the other side of the bidirectional interleaved converter; and
   a path forming device configured to form a power transfer path between the power generator, the one side of the unidirectional converter, the one side of the bidirectional interleaved converter, and the storage device,
   wherein the path forming device comprises:
   a first switch unit having a first terminal, a second terminal and a third terminal, and interconnecting the first terminal of the first switch unit to the second terminal of the first switch unit or the third terminal of the first switch unit, wherein the first terminal of the first switch unit is connected to the power generator, and the second terminal of the first switch unit is connected to the unidirectional converter, and a second switch unit having a first terminal, a second terminal and a third terminal, and interconnecting the second terminal of the second switch unit to the first terminal of the second switch unit or the third terminal of the second switch unit, wherein the first terminal of the second switch unit is connected to the storage device, the second terminal of the second switch unit is connected to the bidirectional interleaved converter, and the third terminal of the second switch unit is connected to the third terminal of the first switch unit.

2. The power supply system of claim 1, wherein the path forming device forms a first path for connecting the power generator to the one side of the unidirectional converter and connecting the storage device to the one side of the bidirectional interleaved converter, or a second path for connecting the power generator to the one side of the bidirectional interleaved converter.

3. The power supply system of claim 2, further comprising one or more of a first sensor measuring an amount of power generation of the power generator;

a second sensor measuring an amount of power storage of the storage device; and a third sensor measuring an amount of load of the system.

4. The power supply system of claim 3, wherein the path forming device receives one or more measured values of the amount of power generation, the amount of power storage, and the amount of load, and forms the first or second path.

5. The power supply system of claim 4, wherein the path forming device forms the first path if the amount of power storage is equal to or smaller than a minimum amount of power storage.

6. The power supply system of claim 4, wherein the path forming device forms the second path if the amount of power storage exceeds a sufficient amount of power storage.

7. The power supply system of claim 4, wherein the path forming device forms the second path if the amount of power generation exceeds the amount of load.

8. The power supply system of claim 1, wherein the path forming device forms the second path if the amount of power generation is equal to or larger than a predetermined value, and forms the first path if the amount of power generation is smaller than the predetermined value.

9. The power supply system of claim 1, wherein the path forming device connects the first terminal of the first switch unit to the second terminal of the first switch unit and connects the first terminal of the second switch unit to the second terminal of the second switch unit, or connects the first terminal of the first switch unit to the third terminal of the first switch unit and connects the second terminal of the second switch unit to the third terminal of the second switch unit.

10. A power supply system comprising:

a power generator configured to generate electrical energy;

a storage device configured to store the electrical energy;

an inverter configured to convert a DC power into an AC power and transferring the AC power to a system;

a unidirectional converter configured to transfer power input through one side the unidirectional converter to the other side of the unidirectional converter with its voltage changed, the unidirectional converter being connected to the inverter through the other side of the unidirectional converter;

a bidirectional interleaved converter configured to transfer the power input through one side of the bidirectional interleaved converter to the other side of the bidirectional interleaved converter through an interleaving method with its voltage changed or to transfer the power input through the other side thereof to the one side thereof through the interleaving method with its voltage changed, and to change the number of current paths for power conversion according to a control signal, the bidirectional interleaved converter being connected to the other side of the unidirectional converter through the other side of the bidirectional interleaved converter;

a path forming device configured to form a power transfer path between the power generator, the one side of the unidirectional converter, the one side of the bidirectional interleaved converter, and the storage device; and a controller configured to control a power transfer direction of the bidirectional interleaved converter, the number of current paths for the power conversion, and forming of a path of the path forming device,.

wherein the controller adjusts the number of current paths for the power conversion of the bidirectional interleaved converter according to the amount of power generation of the power generator or the amount of power storage of the storage device, and wherein the path forming device comprises:

a first switch unit having a first terminal, a second terminal and a third terminal, and interconnecting the first terminal of the first switch unit to the second terminal of the first switch unit or the third terminal of the first switch unit, wherein the first terminal of the first switch unit is connected to the power generator, and the second terminal of the first switch unit is connected to the unidirectional converter, and a second switch unit having a first terminal, a second terminal and a third terminal, and interconnecting the second terminal of the second switch unit to the first terminal of the second switch unit or the third terminal of the second switch unit, wherein the first terminal of the second switch unit is connected to the storage device, the second terminal of the second switch unit is connected to the bidirectional interleaved converter, and the third terminal of the second switch unit is connected to the third terminal of the first switch unit.

11. A power supply method using a power supply system which includes a power generator, a storage device, a unidirectional converter, and a bidirectional interleaved converter, and in which the other side of the unidirectional converter is connected to the other side of the bidirectional interleaved converter and power is output from the other side of the unidirectional converter, the power supply method comprising:

measuring one or more of an amount of power generation of the power generator and an amount of power storage of the storage device;

forming a power transfer path by analyzing one or more of the amount of power generation and the amount of power storage; and controlling activation of devices on the formed power transfer path, wherein the path forming step forms one path among three path, the three path comprising:

a first path for connecting the power generator to the one side of the unidirectional converter to transfer the power;
a second path for connecting the power generator to an input terminal of the unidirectional converter and connecting the one side of the bidirectional interleaved converter to the storage device to transfer the power; and
a third path for connecting the power generator to the one side of the bidirectional interleaved converter to transfer the power.

12. The power supply method of claim 11, wherein the controlling step changes the number of current paths for the power conversion of the bidirectional interleaved converter according to the amount of power generation or the amount of power storage in the case where the bidirectional interleaved converter is provided on the formed power transfer path.

13. A power supply system comprising:
a power generator configured to generate electrical energy;
a storage device configured to store the electrical energy;
an inverter configured to convert a DC power into an AC power and transferring the AC power to a system;
a first converter configured to transfer input power to the inverter with its voltage changed, the first converter being connected to the inverter;
a second converter configure to transfer input power to the inverter with its voltage changed, or to transfer power input through the inverter to the storage device with its voltage changed, the second converter being connected to the inverter and being arranged in parallel to the first converter;
a path forming device configured to form a power transfer path between the power generator, the first converter, the second converter, and the storage device; and a controller configured to control a power transfer direction of the second converter, the number of current paths for power conversion, and formation of a path of the path forming device,
wherein the path forming device comprises:
a first switch unit having a first terminal, a second terminal and a third terminal, and interconnecting the first terminal of the first switch unit to the second terminal of the first switch unit or the third terminal of the first switch unit, wherein the first terminal of the first switch unit is connected to the power generator, and the second terminal of the first switch unit is connected to the first converter, and a second switch unit having a first terminal, a second terminal and a third terminal, and interconnecting the second terminal of the second switch unit to the first terminal of the second switch unit or the third terminal of the second switch unit,
wherein the first terminal of the second switch unit is connected to the storage device, the second terminal of the second switch unit is connected to the second converter, and the third terminal of the second switch unit is connected to the third terminal of the first switch unit.

14. The power supply system of claim 13, wherein the first converter transfers power by using at least one of a unidirectional converter, a bidirectional converter, a unidirectional interleaved converter and a bidirectional interleaved converter.

15. The power supply system of claim 13, wherein the second converter transfers power in both directions by using at least one of a bidirectional converter and a bidirectional interleaved converter.

16. The power supply system of claim 13, further comprising at least one of a first sensor measuring an amount of power generation of the power generator;
a second sensor measuring an amount of power storage of the storage device; and
a third sensor measuring an amount of load of the system.

17. The power supply system of claim 16, wherein the path forming device connects the power generator with the first converter and connects the storage device with the second converter if the amount of power storage exceeds a predetermined minimum amount of power storage and is equal to or smaller than a predetermined maximum amount of power storage, and the amount of power generation exceeds the amount of load.

18. The power supply system of claim 16, wherein the path forming device connects the power generator with the first converter and connects the storage device with the second converter if the amount of power storage is equal to or larger than a predetermined minimum amount of power storage and is smaller than a predetermined maximum amount of power storage, and the amount of load exceeds the amount of power generation.

19. The power supply system of claim 16, wherein the path forming device connects the power generator with at least one of the first converter and the second converter if the amount of power storage is equal to or smaller than a predetermined minimum amount of power storage, and the amount of load exceeds the amount of power generation.

20. The power supply system of claim 16, wherein the path forming device connects the power generator with at least one of the first converter and the second converter if the amount of power storage is equal to or larger than a predetermined maximum amount of power storage, and the amount of power generation exceeds the amount of load.

21. The power supply system of claim 16, wherein the path forming device connects the power generator with the first converter and connects the storage device with the second converter if the amount of power storage is equal to or smaller than a predetermined minimum amount of power storage, and the amount of power generation exceeds the amount of load.

22. The power supply system of claim 16, wherein the path forming device connects the power generator with the first converter and connects the storage device with the second converter if the amount of power storage is equal to or larger than a predetermined maximum amount of power storage, and the amount of load exceeds the amount of power generation.

23. The power supply system of claim 16, wherein the path forming device connects the storage device with at least one of the first converter and the second converter if the amount of power generation is insufficient to supply power to the system.

24. The power supply system of claim 16, wherein the controller changes the number of the current paths based on the amount of power generation or the amount of power storage.

* * * * *